(12) United States Patent
Ortega-Binderberger (10) Patent No.: US 9,461,898 B2
(45) Date of Patent: Oct. 4, 2016

(54) DETERMINING DURATION OF IDLENESS OR ABANDONMENT OF RESOURCES AND PROPERTY

(71) Applicant: Google Inc., Mountain View, CA (US)

(72) Inventor: Michael Ortega-Binderberger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 13/779,342

(22) Filed: Feb. 27, 2013

(65) Prior Publication Data

US 2014/0244829 A1 Aug. 28, 2014

(51) Int. Cl.
*H04L 12/26* (2006.01)
*H04W 12/06* (2009.01)
*H04L 29/06* (2006.01)
*B60N 2/26* (2006.01)
*G08B 21/22* (2006.01)
*H04W 4/00* (2009.01)

(52) U.S. Cl.
CPC ............ *H04L 43/0805* (2013.01); *B60N 2/26* (2013.01); *G08B 21/22* (2013.01); *H04L 63/08* (2013.01); *H04W 4/008* (2013.01); *H04W 12/06* (2013.01)

(58) Field of Classification Search
CPC ..... G08B 21/22; H04L 63/062; H04L 63/08; H04L 63/10; H04W 12/06; B60N 2/28; B60N 2/26; B60N 2/002
See application file for complete search history.

(56) References Cited

U.S. PATENT DOCUMENTS

| | | | |
|---|---|---|---|
| 7,366,512 B1* | 4/2008 | Kefalas | G06Q 10/02 455/414.1 |
| 7,463,147 B1 | 12/2008 | Laffoon et al. | |
| 7,487,913 B2 | 2/2009 | Adema et al. | |
| 7,764,173 B2 | 7/2010 | Yamagiwa | |
| 8,570,168 B2* | 10/2013 | Logan | H04Q 9/00 340/539.32 |
| 2006/0095286 A1* | 5/2006 | Kimura | G06F 17/30864 705/307 |
| 2009/0146813 A1* | 6/2009 | Nuno | 340/572.1 |
| 2013/0049955 A1* | 2/2013 | Hoover et al. | 340/539.11 |
| 2014/0026204 A1* | 1/2014 | Buntinx | 726/9 |

FOREIGN PATENT DOCUMENTS

WO WO 2008/047358 A2 4/2008

* cited by examiner

*Primary Examiner* — Chirag R Patel
(74) *Attorney, Agent, or Firm* — Shumaker & Sieffert, P.A.

(57) ABSTRACT

The present disclosure provides methods and systems for determining the duration of time that has passed since temporarily idle or abandoned resources or property were last in use or possessed. The methods and systems provide for determining the point in time at which resources or property become idle or abandoned and for registering the cessation of use or abandonment event. Thereafter, the methods and systems provide for receiving and responding to queries concerning the temporarily idle or abandoned property and for detecting and registering resumption of use or reclamation events.

18 Claims, 9 Drawing Sheets

DETERMINING DURATION OF IDLENESS OR ABANDONMENT OF RESOURCES AND PROPERTY

BACKGROUND

In the fast-paced world of the twenty-first century, the ability to attend to multiple tasks at the same time or to rapidly switch between multiple tasks is highly valued. However, many tasks are resource dependent and in attempting to multitask, people may tie up resources in the service of a task which they are not actively attending to. Where resources and property are reserved but left idle by one actor as a result of that actor's attention being diverted to an alternative task, other actors are deprived of the opportunity to use those resources and property toward productive endeavors of their own. Problems caused by idle resources and property are exacerbated when the resources and property are communally owned by a community or the public.

As the human population continues to grow, ever-greater numbers of people rely on public and community resources. Business models that provide for collaborative consumption and use of resources are becoming increasingly commonplace and experiencing ever-greater levels of success. Consumers are becoming increasingly interested in purchasing the right to use or exercise control over a resource for some period of time as opposed to more traditional methods of purchasing the exclusive right to use or exercise control over a resource. Efficient collaborative use of resources is also important to businesses that provide shared resources as an incidental value added to the purchase of other goods and service. In such business models, the average overall customer experience is directly related to the efficiency with which such shared resources are utilized.

In other cases, attempts to multitask may result in property and resources being left idle in a manner that may pose a threat to other people who come into contact with the property or resource. Similarly, property and resources may be left idle in a manner that does not pose a threat but merely troubles or confuses passer-bys. For example, while running into a store, a driver might leave a car parked very close to an intersection with its hazard lights on and thereby increase the risk of an automobile accident by reducing visibility near the intersection. In other cases, a driver may temporarily park in a parking space owned by another driver and thereby inconvenience the owner of the parking space. Such situations evidence the fact that the temporary abandonment of property can impose externalities on others.

SUMMARY

Implementations of the present disclosure provide methods and systems for determining the duration of time that has passed since temporarily idle or abandoned resources or property were last in use or possessed. The methods and systems provide for determining the point in time at which resources or property become idle or abandoned and for registering the cessation of use or abandonment event that signifies such point in time. Thereafter, the methods and systems provide for receiving and responding to queries concerning the temporarily idle or abandoned property and for detecting and registering resumption of use or reclamation events.

According to one embodiment, a method, executed on a computer readable storage device, for providing information pertaining to the duration of time property, whether individually, communally, or otherwise owned, has been idle or abandoned, is disclosed, the method comprising receiving, from a first client, information pertaining to an event indicating that the property has become idle or abandoned, receiving, from a second client, a query regarding the property, and providing the information pertaining to the event to the second client, wherein the event is detected with short-range communication technologies and the second client ascertains the identity of the property through short-range communication technologies.

According to another embodiment, a computer readable storage device for providing information pertaining to the duration of time property, whether individually, communally, or otherwise owned, has been idle or abandoned is described, the computer readable medium having stored thereon computer executable instructions for receiving, from a first client, information pertaining to an event indicating that the property has become idle or abandoned, receiving, from a second client, a query regarding the property, and providing the information pertaining to the event to the second client, wherein the event is detected with short-range communication technologies and the second client ascertains the identity of the property through short-range communication technologies.

According to an alternative embodiment, a method, executed by a processor, for determining the duration of time property, whether individually, communally, or otherwise owned, has been idle or abandoned is described, the method comprising establishing a communication link with the property, requesting an identifier for the property, receiving an identifier for the property, submitting a query including the identifier for the property, and receiving, information pertaining to the duration of time the property has been idle or abandoned.

DETAILED DESCRIPTION

Figure 1:
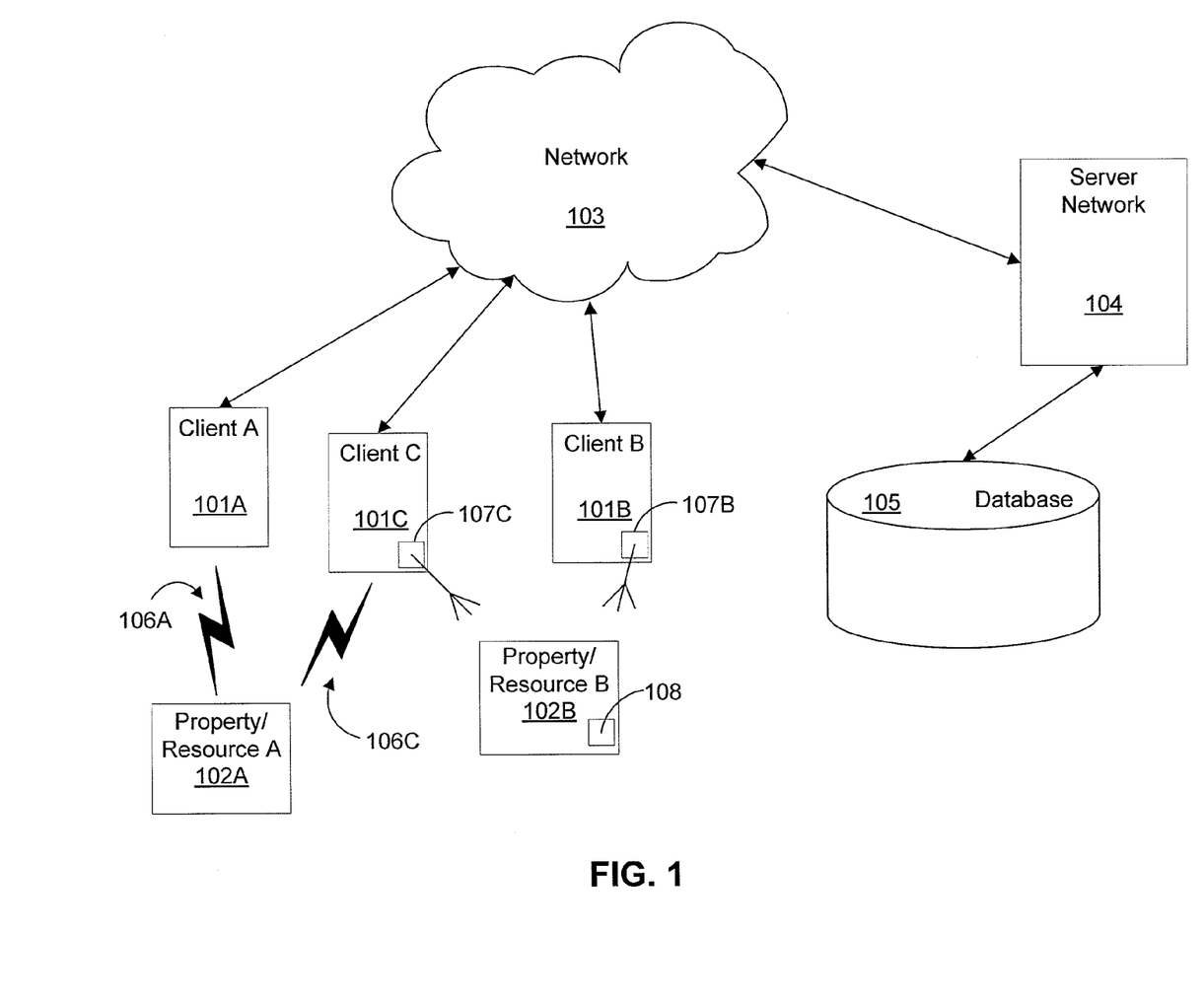
FIG. 1 is a block diagram of an example environment in which the methodology for determining the duration of idleness or of a temporary abandonment event may be implemented.

FIG. 1 is a block diagram of an example communications environment in which various embodiments of the present disclosure may be implemented. In the environment depicted by FIG. 1, multiple clients 101 are connected to a network 103. Clients 101 may be capable of establishing connections 106 with multiple properties/resources 102. For example, client A 101A is capable of establishing a connection 106A with property/resource A 102A. In addition, clients 101 may be equipped with one or more scanners/readers 107. For example, client B 101B is equipped with scanner/reader 107B. Similarly, properties/resources 102 may be equipped with scanners/readers or elements capable of being scanned/read 108. For example, property/resource B 102B is equipped with element capable of being scanned/read 108. The multiple clients 101 are connected to a server array 104 through a data network 103. Server array 104 is additionally connected to database group 105.

Any of clients 101 may be a smart phone, a tablet computer, a laptop computer, a watch with a computer operating system, a personal digital assistant (PDA), or any one of a number of additional devices that may be equipped with the ability to scan or identify nearby property or resources or that may be capable of establishing a connection 106 with nearby property or resources. While many embodiments of the present disclosure pertain to clients 101 which are highly mobile, mobility is not a requirement of clients 101. Examples of a client 101 include but are not limited to a desktop computer, a video game console, a stationary or portable scanning device, and a stationary or portable monitoring device. Such scanning and monitoring devices may be components of devices that have alternative primary functions. For example, a scanning or monitoring device may be a component of a parking meter.

Connections 106 between clients 101 and properties/resources 102 may include but are not limited to wireless local area network (WLAN) connections, wireless personal area network (WPAN) connections, and other types of network connections. For example, connections 106 may include but are not limited to Bluetooth connections, ZigBee connections, wireless USB connections, Z-Wave connections, and IrDA connections. Therefore, in FIG. 1, the connection 106A between client A 101A and property/resource A 102A and the connection 106C between client C 101C and property resource A 102A may be any of the aforementioned connections or may be any other type of connection through which information may be communicated. Scanners/readers 107 may include but are not limited to barcode scanners, cameras, and near field communication (NFC) scanners. Therefore, in FIG. 1, the scanner/reader 107B of client B 101B and the scanner/reader 107C of client C 101C may be any of the aforementioned scanners/readers or may be any other type of scanner/reader capable of acquiring information from a property/resource, such as property/resource B 102B. Similarly, elements capable of being scanned/read 108 may include but are not limited to barcodes, an RFID tag, an NFC tag, an image, and a physical object of which a camera can produce an image. Therefore, element capable of being scanned read 108 of property/resource B 102B may be any of the aforementioned elements or may be any other element capable of providing information to a scanner/reader 107 or capable of embodying information that can be acquired by a scanner/reader 107.

The example environment also contains a network 103 that connects the multiple clients 101 to the server array 104. Network 103 may be either a wired or a wireless network. Example networks include but are not limited to an LTE network, a GSM network, a CDMA network, a fiber optic network, and other voice or data networks. The Network 103 allows the multiple clients 101 to communicate with server array 104. For example, the clients 101 may transmit information to server array 104 and receive information from server array 104. Network 103 may include a set of cell towers, as well as a set of base stations and/or mobile switching centers (MSCs). As appreciated by those skilled in the art, network 103 may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of data network 103, the data network 103 may include one or more IP multimedia subsystems (IMS), serving gateways (SGW), and evolved node Bs (eNB). One of ordinary skill in the art will recognize that additional components not mentioned herein may be used by network 103.

Server array 104 is connected to the clients 101 through network 103. The connection enables server array 104 to both receive data from clients 101 and transmit data to clients 101. Servers of server array 104 comprise processors and memory configured to receive information from a multitude of clients 101 and to provide information to a multitude of clients 101. The information received by server array 104 may pertain to the identifiers of properties/resources 106, to identifiers of clients 101, to connections 106, to scanners/readers 107, and to elements capable of being scanned/read, such as element 108. Processors and memory located at the servers of server array 104 may further be configured to collect, index, organize, aggregate, and otherwise process information pertaining to a multitude of properties/resources 102 and to clients 101 that report or request information pertaining to the properties/resources 102. Processors and memory located at the servers within the server array 104 may also be configured to store the information at a database, such as database in database group 105, or to access additional information stored at a database, such as a database in database group 105. Access to some information stored at databases may be limited and may require some form of authentication prior to access. For example, information related to a particular user account may be limited pursuant to the settings of such user account.

Examples of information requested by server array 104 may include information pertaining to a user account linked to a property/resource, such as property/resource A 102A, to a user account linked to client A 101A, to a user account linked to client C 101C, and to other user accounts. However, a server in server array 104 will only receive the requested information if the server provides the requisite credentials to demonstrate permission to access the requested information. Furthermore, the server may request information from other sources linked to such user accounts.

For example, after identifying a user account associated with client A 101A, the server may request information pertaining to other accounts associated with the user account associated with client A 101A. Server array 104 may also attempt to request information related to the context of a property/resource, such as property/resource A 102A or related to the context of a client, such as client A 101A. Context information may include, e.g. location of the client, location of the property or resource, weather (e.g. temperature and humidity) at the location of the client, property, or resource, and events scheduled to take place in the vicinity of the client, property or resource.

Server array 104 is also connected to a database group 105. Database group 105 may store a variety of information, including, e.g., the information acquired by server array 104 pertaining to properties/resources 102, clients 101, connections 106, scanners/readers 107, and elements capable of being scanned/read, such as element 108. For example, database group 105 may store the identity of property/resource A 102A, the time at which property/resource A 102A became idle or abandoned, the location where property/resource A 102A became idle or abandoned, and the identity of a user account associated with property/resource A 102A. Database group 105 may also store information associated with a user account linked to property/resource A 102A, such as privacy settings, a contact list, an address book, access permissions, and contact information. Database group 105 may also store user account data, such as user account data for a user account linked to a property/resource, such as property/resource A 102A, or user account data for a user account linked to a client, such as client A 101A.

Implementations of the present disclosure provide methods and systems for determining the duration of time that has passed since temporarily idle or abandoned resources or property were last in use or possessed. The methods and systems provide for determining the point in time at which resources or property become idle or abandoned and for registering the cessation of use or abandonment event that signifies such point in time. Thereafter, the methods and systems provide for receiving and responding to queries concerning the temporarily idle or abandoned property and for detecting and registering resumption of use or reclamation events. Such property and resources may be owned by an individual, by a group or community, or by the entire public.

Embodiments of the present disclosure provide for detecting an event that indicates that a resource has become idle or that indicates that some property has become abandoned, i.e. for detecting cessation of use or abandonment events. For example, under certain circumstances, a communication link between a communicative element incorporated into a resource and a device operated by or linked to the user can indicate that the resource is being used. Under such circumstances, the severance of the communication link can indicate that the resource has become idle. For example, a patron of a café may sit at a table at the café and the smart phone in the patron's pocket may establish periodic NFC connections with an RFID device embedded in the table. Subsequently, the patron may leave a number of invaluable possessions on the table at the café and get up and leave the café, thereby causing the periodic communications between the smart phone and the RFID device to end. Under such circumstances, the cessation of the periodic communications between the smart phone and the RFID device would indicate that the patron is no longer using the table and that the table has become idle.

Similarly, under some circumstances, a communication link between a piece of property and a device linked to an owner will be active whenever the property is possessed by the owner. Under such circumstances, when the owner temporarily relinquishes active possession of the property, i.e. abandons the property, the communication link will be severed. Therefore, the severance of the communication link will indicate that the property has become abandoned, at least temporarily. For example, a dog owner walking his dog may decide to tie his dog to a tree while walking into a store to purchase a latte, treats for the dog, groceries, or some other item. While in close proximity to the dog, a Bluetooth connection could be established between the dog owner's smart phone and a Bluetooth device in the dog's collar. After the owner ties the dog to the tree and enters the store, the Bluetooth connection would be severed thereby indicating that the owner has, at least temporarily, abandoned his dog.

In some embodiments, upon detecting the severance of a communication link between a communicative element of a resource and a device operated by a user, a client may transmit information pertaining to the resource to a server array. In order to do so, the client may need to acquire permission to transmit information to the server array. Permission can be provided for the transmission of entire classes of information, can be provided for individual pieces of information, and can also be provided according to a number of other factors, such as according to recipient and according to sender. Similarly, upon detecting the severance of a communication link between a device linked to an owner and a piece of property, the device linked to the owner may transmit information pertaining to the owner and the property to a server array. Alternatively, an element of the idle resource or an element of the abandoned property may transmit information pertaining to the resource to the server array. In the example above involving the café, upon detecting the severance of the communication link between the patron's smart phone and the table at the café, information pertaining to the table and to the RFID device may be transmitted to a server array by the communicative element of the table. If the patron provides such information or grants permission to access such information to the communicative element, then information pertaining to the patron and the patron's smart phone might also be provided to the server array. The information might also be provided to the server array by the patron's smart phone. Information transmitted to the server array may include the location at which the communication link between the RFID device and the patron's smart phone was severed, the time at which the communication link was established and the time at which it was severed, an identifier for the table, and the identity of the café. If the patron, i.e. the user of the smart phone, provides such information or grants permission to access such information to the communicative element, the information transmitted might also include the identity of the patron, the patron's contact information, and other information pertaining to the patron. Under such circumstances, providing information pertaining to the patron could allow another customer interested in using the table to contact the patron and thereby establish mutually beneficial scheduling of the table.

Similarly, in the above example involving the Bluetooth-enabled dog collar, upon determining that the communication link between the collar and the dog owner's smart phone was severed, and if the dog owner had provided permission for it to do so, the dog owner's smart phone may transmit information pertaining to one or more of the dog, the dog collar, the owner, and the owner's smart phone to a server array. Similarly, if it is equipped to do so and permitted to do so by the dog owner, the dog collar may transmit information pertaining to the dog, the dog collar, the owner, and the owner's smart phone to a server array. Information transmitted to the server array might include the location at which the connection between the smart phone and the collar was established, the location at which the connection was severed, the time at which the connection was established, the time at which the connection was severed, the identity of one or more businesses near where the connection was severed, the identity of the dog owner, the name of the dog, and the dog owner's contact information. By providing information pertaining to the dog and the owner, the owner could allow passersby to notify the owner of possible danger to the dog. Under such circumstances, if any harm were to come to the dog, the owner could be contacted. Similarly, a passer-by concerned about the dog's well being could contact the owner and get more information about why the dog was left tied up prior to calling animal control. Alternatively, the passer-by might merely find out how long the dog had been tied up and decide to pass on by.

Embodiments of the present disclosure additionally provide for receiving a request for information pertaining to an idle resource or to abandoned property. For example, a client may scan a resource or a piece of property and transmit the information acquired from the scan to a server along with a request for additional information pertaining to the resource or piece of property. Alternatively, the client may establish a communicative connection with an idle resource or with abandoned property and acquire information pertaining to the resource or property through the connection. In many embodiments, the owner of the idle resource or abandoned property must permit the resource or property to establish connections with other devices. For example, a customer at a restaurant or café may scan or establish a link with a table at the restaurant or café that appears to be abandoned but still has another customer's belongings on it. Similarly, the owner of a parking space may scan or establish a link with a car improperly parked in his space and potentially contact the owner about moving the car. Under such circumstances, the owner of the parking space may regain use of the space more quickly than if a tow truck was called and the owner of the improperly parked car could save the towing fare.

For example, upon scanning or establishing a connection with a resource or property, the client may request an identifier for the resource of property, information pertaining to the owner of the property, and information pertaining to the time at which the last cessation of use of the resource or abandonment of a piece of property occurred. In some embodiments, the resource or property will request that the client requesting information from the resource or property provide information to the resource or property. For example, the resource or property may request that the client provide an identifier or verification that the client is linked to a user account. In such embodiments, the resource or property may determine whether or not information should be provided to the client based upon the information provided by the client. The resource or property may also provide encrypted information to the client. The client may be able to obtain an encryption key or other means by which to decrypt the information provided by the resource or property. For example, the client may perform an authentication procedure with a remote server after which the client may receive an encryption key. Alternatively, the client may transmit the encrypted information to a remote server where it can be decrypted.

After acquiring information from a resource or property, the client may transmit the acquired information to a server or server array. The information transmitted by the client may be encrypted. In addition, if the client is permitted to do so, it may also transmit information pertaining to the client, including, e.g., a user account linked to the client. The client may also submit a query requesting additional information regarding the resource or property from a remote computerized device, e.g. a server or server array. The query submitted by the client to the server may request information pertaining to the abandoned property or to the idle resource. The client may request specific information from the server, or the client may simply request the information that the server is permitted to provide to the client.

Upon receiving the request from the client, the server may request additional information from the client in order to determine whether or not the server is permitted to release information to the client. The owner of the property or resource about which the client is requesting information may restrict access to the information in a variety of manners. The owner of the property or resource may set privacy controls whereby the owner may individually select user accounts that have permission to access information regarding the resource or property or may make information regarding the resource or property available to a category of user accounts. For example, the owner of the resource or property may make the information available to the owner's friends on a social network, to clients within some distance of the property or resource, or to all members of the public. Alternatively, the owner of the resource or property may restrict certain categories of information by making some categories of information only available to certain user accounts or to certain categories of user accounts. Similarly, the owner of the resource or property may restrict individually selected fields of information in the same manner. For example, the owner of a dog may allow any member of the public who establishes a connection with the dog's Bluetooth collar to access information pertaining to the length of time that the dog and owner have been separated, but only allow friends of the owner on a social network to access information pertaining to the identity of the owner. Furthermore, the dog owner may limit the distribution of the owner's contact information to individuals to whom the dog owner has specifically elected, on an individual basis, to have access to the owner's contact information. Such privacy settings and restrictions on the dissemination of information may be stored at a database, at a server or a server array, or on some element of the resource or property being scanned.

Therefore, in order to determine whether or not the server has permission to release information to the client, the server may need to identify a user account associated with the client. For example, the server may require that the client provide authentication of an active session with a particular account, such as a social network account, as a condition of releasing information to the server. After determining what information the client has requested and the subset of the requested information to which the client has access, the server may transmit the information to the client. In alternative embodiments of the disclosure, the client may query another client or a device at the abandoned property or the idle resource, and the other client or the device will serve as a medium for transmission of information between the server and the requesting client.

Embodiments of the present disclosure also provide for detecting and registering resumption of use or reclamation events. A communicative element of an idle resource or piece of abandoned property may determine that an event indicating the resumption of use of a resource or the reclamation of a piece of abandoned property has occurred. Events indicating the resumption of use of a resource or the reclamation of a piece of property include the establishment of a communication link, the commencement of periodic communications between a client and a communicative element of the resource or property, and the scanning of an NFC tag or barcode. For example, a smart phone may determine that it has begun to receive periodic transmissions from an NFC chip embedded in a table at a café. Thereafter, the smart phone may send a transmission to a server that includes the time at which the periodic signal transmissions began, the location of the client when the periodic transmissions began, an identifier of the device sending the periodic signal transmissions, an identifier of the device receiving the periodic signal transmissions, and a user account linked to the device receiving the periodic signal transmissions.

Figure 2:
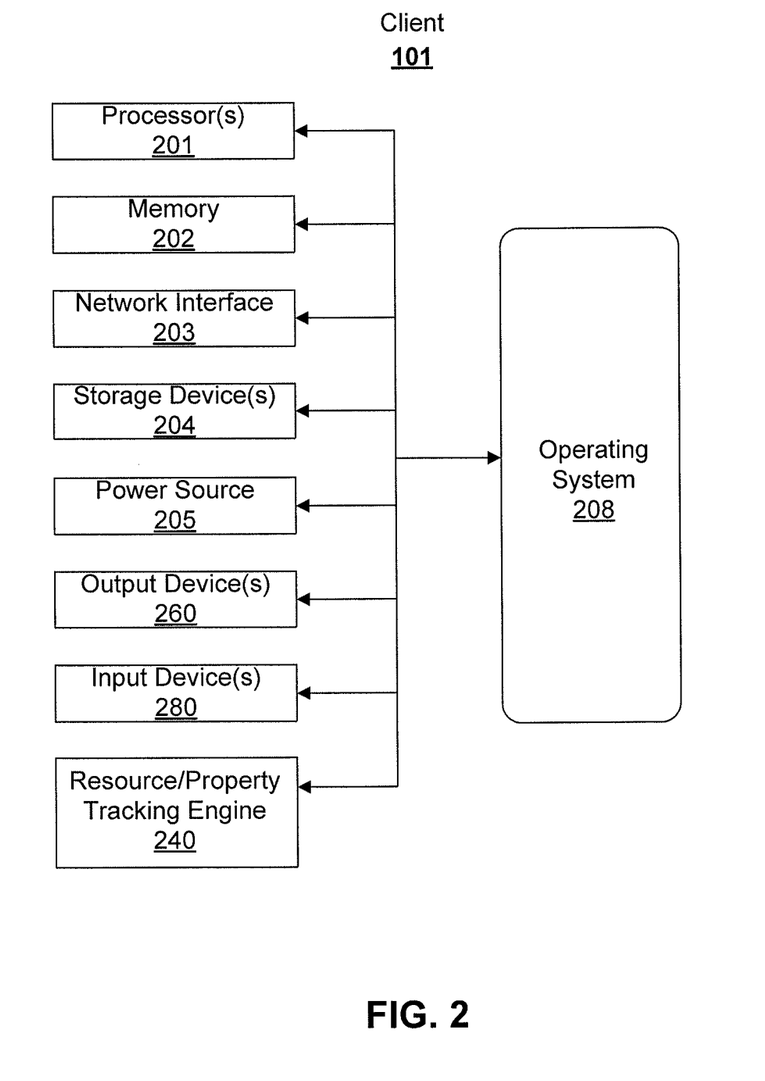
FIG. 2 is a block diagram of the basic functional components for a client in FIG. 1, according to one aspect of the disclosure.

Turning now to FIG. 2, one particular example of a client 200 is illustrated. In general, many other embodiments of the client 200 may be used as long as the embodiment is capable of acquiring information from a resource or property and transmitting information and requests to a server or server array through a network. In the illustrated embodiment of FIG. 2, the client 200 includes one or more processors 201, memory 202, a network interface 203, one or more storage devices 204, a power source 205, one or more output devices 260, and one or more input devices 280. The client 200 also includes an operating system 208 that is executable by a client and a resource/property tracking engine 240. In a conventional fashion, each of components 201, 202, 203, 204, 205, 260, 280, 208, and 240 are interconnected physically, communicatively, and/or operatively for inter-component communications.

As illustrated, processors 201 are configured to implement functionality and/or process instructions for execution within client 200. For example, processors 201 execute instructions stored in memory 202 or instructions stored on storage devices 204. Memory 202, which may be a non-transient, computer-readable storage medium, is configured to store information within client 200 during operation. In some embodiments, memory 202 includes a temporary memory, i.e. an area for information not to be maintained when the client 200 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client 200 uses network interface 203 to communicate with external devices via one or more networks, such as the network 103 of FIG. 1 or the network through which connection 106 between client 200 and resources/properties 102 are established. Such networks may include one or more wireless networks, wired networks, fiber optics networks, and other types of networks through which communication between the client 200 and an external device may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi radios in mobile computing devices, and USB.

The client 200 includes one or more input devices 280. Input devices 280 are configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in client 200. Output devices 260 are configured to provide output to a user using tactile, audio, and/or video stimuli. Output device 260 may include a display screen (which may be part of a presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The client 200 includes one or more power sources 205 to provide power to the client. Non-limiting examples of power source 205 include single-use power sources, rechargeable power sources, and/or power sources developed from nickel-cadmium, lithium-ion, or other suitable material.

The client 200 includes an operating system 208, such as the Android® operating system. The operating system 208 controls operations of the components of the client 200. For example, the operating system 208 facilitates the interaction of resource/property tracking engine 240 with processors 201, memory 202, network interface 203, storage device(s) 204, input device 280, output device 260, and power source 205.

Resource/property tracking engine 240 typically includes program instructions and/or data that are executable by the client 200. In some embodiments, resource/property tracking engine 240 is a part of operating system 208 executing on the client 200. Resource/property tracking engine 240 includes program instructions and/or data that are executable by the client 200. The program instructions and data included in the resource property tracking engine 240 include instructions for determining that an event indicating the cessation of use of a resource or the abandonment of a piece of property has occurred. Instructions for transmitting information associated with such an event, instructions for determining that an event indicating the resumption of use of a resource or the reclamation of a piece of abandoned property has occurred, and instructions for transmitting information associated with such an event are also included. Furthermore, instructions for establishing a connections with or scanning resources and property, instructions for transmitting queries requesting information pertaining to a property or resources, and instructions for displaying information pertaining to property or resources may additionally be included.

Figure 3:
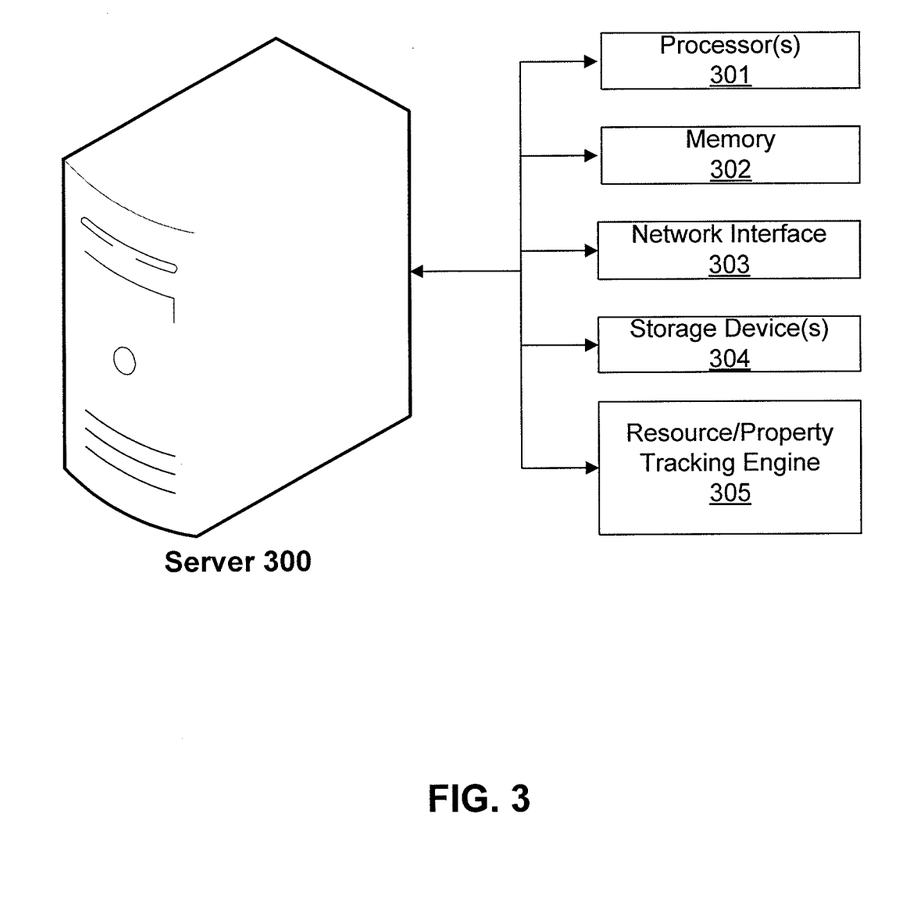
FIG. 3 is a block diagram of the basic functional components for a server, according to one aspect of the disclosure.

Moving to FIG. 3, a block diagram of basic functional components for a server 300, according to one aspect of the disclosure, is depicted. The server 300 includes one or more processors 301, memory 302, a network interface 303, one or more storage devices 304, and a connection record engine 305. In a conventional fashion, each of components 301, 302, 303, 304, and 305 are interconnected physically, communicatively, and/or operatively for inter-component communications.

As illustrated, processors 301 are configured to implement functionality and/or process instructions for execution within server 300. For example, processors 301 execute instructions stored in memory 302 or instructions stored on storage devices 304. Memory 302, which may be a non-transient, computer-readable storage medium, is configured to store information within server 300 during operation. In some embodiments, memory 302 includes a temporary memory, i.e. an area for information not to be maintained when the server 300 is turned off. Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 300 uses network interface 303 to communicate with external devices via one or more networks, such as the network 103 of FIG. 1. Such networks may include one or more wireless networks, wired networks, fiber optics networks, and other types of networks through which communication between the server 300 and an external device may be established. Network interface 303 may be a network interface card, such as an Ethernet card, an optical transceiver, a radio frequency transceiver, or any other type of device that can send and receive information.

The server side resource property tracking engine 305 includes program instructions and/or data that are executable by the server 300. The program instructions and data included in the server side resource property tracking engine 305 include instructions to receive information pertaining to events indicating the cessation of use of a resource or the abandonment of a piece of property and to store such information in memory. The program instructions and data also include instructions to receive information pertaining to events indicating the resumption of use of a resource or to the reclamation of a piece of abandoned property and to store such information. The program instructions and data further include instructions to receive queries for information pertaining to idle resources or abandoned property, to determine whether the information requested by the requesting client is available to the requesting client, and to provide information that is available to the requesting client to the requesting client.

Figure 4:
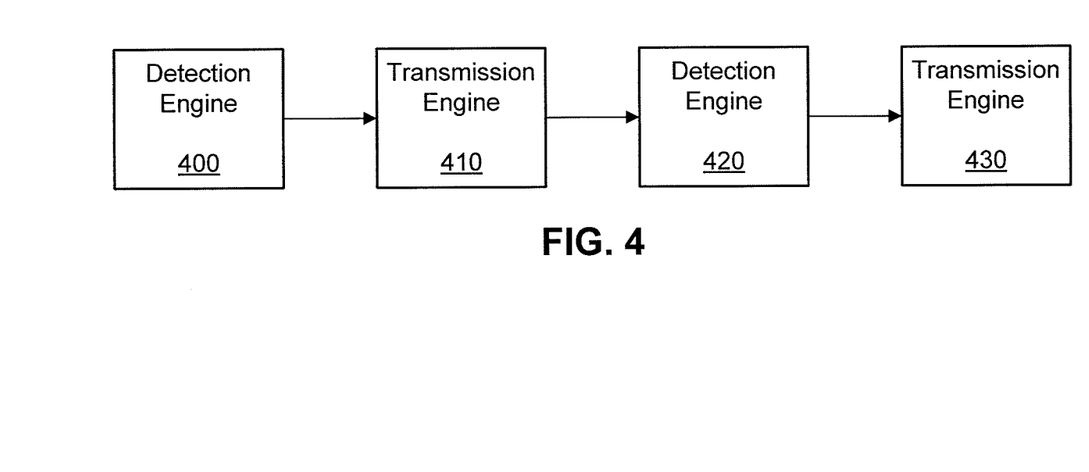
FIG. 4 is a block diagram of the various states of a processor of a client during an example process of detecting and reporting cessation of use and resumption of use events and abandonment and reclamation events, according to one aspect of the disclosure.

Turning now to FIG. 4, a block diagram of the various states of a processor of a client during an example process of detecting and reporting cessation of use and resumption of use events and abandonment and reclamation events, according to one aspect of the disclosure is shown. At 400, the processor of a client is configured as a detection engine. The detection engine is configured to determine that an event has occurred that indicates the cessation of use of a resource or the abandonment of a piece of property. Events indicating the cessation of use of a resource of the abandonment of a piece of property include but are not limited to the severance of a communication link, the cessation of periodic communication between a device owned or operated by a user and a device linked to the resource or property, and the scanning of an NFC tag or barcode. At 410, the processor is configured as a transmission engine. The transmission engine is configured to transmit information associated with an event indicating the cessation of use of a resource or an event indicating the abandonment of a piece of property. Information associated with such an event may include but is not limited to the time the event occurred, the location where the event occurred, an identifier of the resource of property, an identifier of the client, and an identifier of a user account linked to the client. For example, the detection engine could determine that a Bluetooth connection between a dog owner's smart phone and a collar is severed, and the transmission engine could transmit to a server or server array the time at which the connection was severed, the location at which the connection was severed, the location at which the connection was established, the identity of a user account associated with the smart phone, the contact information of the user associated with the user account, the name of the dog, a picture of the dog, as well as additional information.

At 420, the processor of a client is configured as a detection engine. At 420, the detection engine is configured as a detection engine configured to determine that an event indicating the resumption of use of a resource or the reclamation of a piece of abandoned property has occurred. Events indicating the resumption of use of a resource or the reclamation of a piece of property include the establishment of a communication link, the commencement of periodic communications between a client and a communicative element of the resource or property, and the scanning of an NFC tag or barcode. At 430, the processor is configured as a transmission engine configured to transmit information associated with an event indicating the resumption of use of a resource of the reclamation of a piece of property. At 430, the transmission engine may transmit information including but not limited to the time at which the resumption of use or reclamation event occurred, the location at which the event occurred, an identifier of the resource or property, and an identifier of the client. For example, at 420, the detection engine may determine that a smart phone has begun to receive periodic signal transmissions from an NFC chip embedded in a table at a café, and at 430 the transmission engine may send a transmission to a server that includes the time at which the periodic signal transmissions began, the location of the client when the period signal transmissions began, an identifier of the device sending the periodic signal transmissions, an identifier of the device receiving the periodic signal transmissions, and, if a user account permits, an identifier of the user account linked to the device receiving the periodic signal transmissions.

Figure 5:
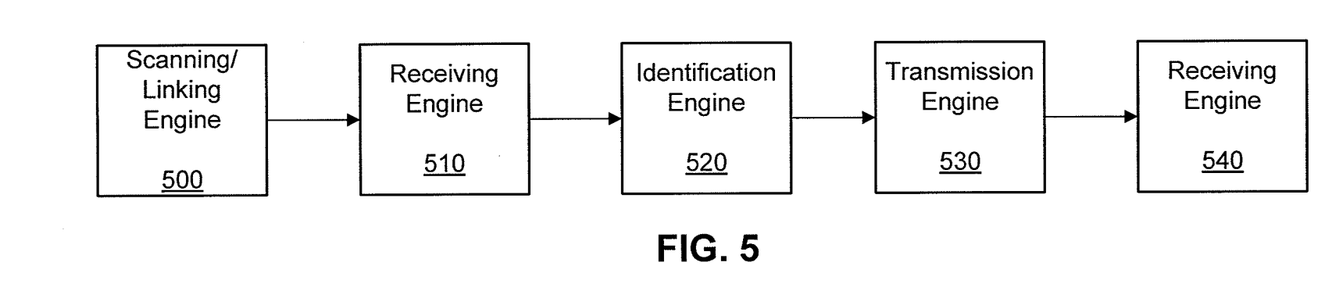
FIG. 5 is a block diagram of the various states of a processor of a client during an example process of acquiring information pertaining to idle or abandoned resources or property, according to one aspect of the disclosure.

FIG. 5 is a block diagram of the various states of a processor of a client during an example process of acquiring information pertaining to idle or abandoned resources or property, according to one aspect of the disclosure. At 500, the processor of the client is configured as a scanning engine or as a linking engine. The scanning engine and linking engine are configured, respectively, to produce a scan or to establish a link between the client and another device, e.g. a communicative element of a resource or property. At 510, the processor of the client is configured as a receiving engine. The receiving engine is configured to receive information produced from, derived from, gathered from, or otherwise developed as a result of the production of the scan or the establishment of a link at 500. At 520, the processor is configured as an identification engine. The identification engine is configured to identify the information received by the receiving engine at 510. The identification engine may involve decrypting information received at 510 if the information received at 510 is encrypted. The identification engine may also identify that the information received at 510 is intended to be transmitted to a server, e.g. that the information includes parameters for a request to a server. Alternatively, the identification engine may determine that the information received at 510 pertains to the identity of a resource or property and other information pertaining to an idle or abandoned status of the resource or property. At 530, the processor is configured as a transmission engine. The transmission engine is configured to transmit information received at 510 and identified at 520. The destination to which the transmission engine transmits information and the manner in which the information is transmitted by the transmission engine may depend upon the identification of the information at 520. In some implementations, the transmission engine 530 transmits information to a server or server array. In other implementations, the transmission engine may transmit information to another engine, layer, or application. The information transmitted by the transmission engine may include an identifier of a resource or property that was scanned or with which a link was established at 500 as well as other information associated with the resource or property. The transmission engine may also transmit information pertaining to the client and an identifier of a user account associated with the client. Furthermore, the transmission engine may transmit requests or instructions. For example, the transmission engine may transmit a request to a server for information pertaining to the duration of idleness of a resource scanned or linked to at 500, or the transmission engine may transmit instructions to display information pertaining to a resource scanned or linked to at 500.

At 540, the processor is configured as a receiving engine. The receiving engine is configured to receive information. For example, the receiving engine may receive information from a server. If the owner of the resource or property permits, the information received from the server may include the time at which the resource or property was left idle, the identity of an account associated with the resource or property, the identity of the owner of the resource or property, the contact information of the owner of a resource, and the current whereabouts of a client associated with the owner of the resource.

Figure 6:
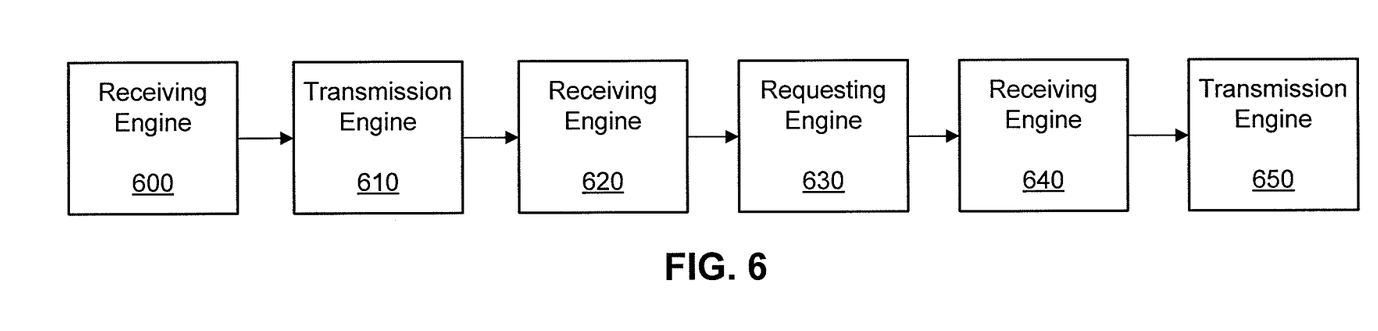
FIG. 6 is a block diagram of the various states of a processor of a server during an example process of providing information pertaining to the duration of resource idleness or of temporary abandonment, according to one aspect of the disclosure.

FIG. 6 is a block diagram of the various states of a processor of a server during an example process of providing information pertaining to the duration of resource idleness or of temporary abandonment, according to one aspect of the disclosure. At 600, the processor of the server is configured as a receiving engine. The receiving engine is configured to receive information pertaining to an event indicating the cessation of use of a resource or the abandonment of a piece of property. For example, at 610, the processor of the server is configured as a transmission engine. The transmission engine is configured to transmit information received at 600 for storage. The information transmitted at 610 can be sent to a memory component of the server, to an external database, or to some other location where data may be stored. At 620, the processor of the server is configured as a receiving engine. The receiving engine at 620 is configured to receive a query requesting information pertaining to a piece of property or to a resource. Additionally, the receiving engine is configured to receive information pertaining to the identity of the client requesting the information pertaining to the property or resource or the identity of a user account associated with the client requesting the information. At 630, the processor of the server is configured as a requesting engine. The requesting engine at 630 requests information pertaining to restrictions on information dissemination. Such restrictions on dissemination of information may have been put in place by the owner of the property or resource about which a request for information was received at 620. Information pertaining to restrictions on information dissemination may be stored, e.g., at a server or at a database, and may, e.g., be associated with a user account. At 640, the processor is configured as a selection engine. The selection engine is configured to select information not restricted from the client that made the request that was received at 620. At 650, the processor is configured as a transmission engine. The transmission engine is configured to transmit information pertaining to the request that was received at 620 based on the selection made at 640.

Figure 7:
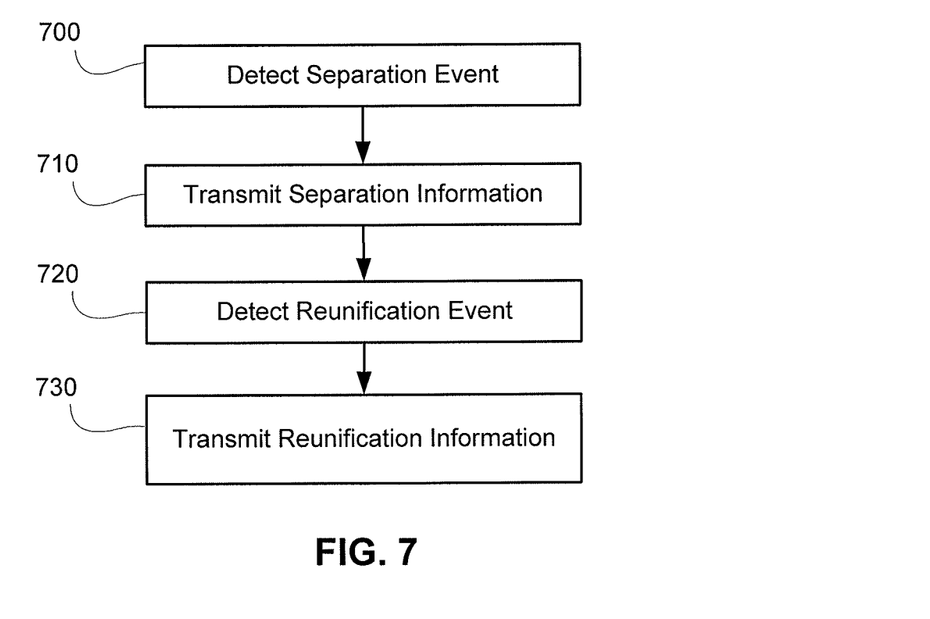
FIG. 7 is a flow diagram illustrating an example method for detecting and reporting cessation of use and resumption of use events and abandonment and reclamation events, according to one aspect of the disclosure.

FIG. 7 is a flow diagram illustrating an example method for detecting and reporting cessation of use and resumption of use events and abandonment and reclamation events, according to one aspect of the disclosure. At 700, a separation event indicating the cessation of use of a resource or the abandonment of a piece of property is detected. Events indicating the cessation of use of a resource of the abandonment of a piece of property include but are not limited to the severance of a communication link, the cessation of periodic communication between a client and a communicative element of the resource or property, and the scanning of an NFC tag or barcode. At 710, information associated with the event indicating the cessation of use of a resource or an event indicating the abandonment of a piece of property. Information associated with such an event may include but is not limited to the time the event occurred, the location where the event occurred, an identifier of the resource of property, an identifier of the client, and an identifier of a user account associated with the client.

At 720, a reunification event indicating the resumption of use of a resource or the reclamation of a piece of abandoned property has occurred is detected. Events indicating the resumption of use of a resource or the reclamation of a piece of property include the establishment of a communication link, the commencement of periodic communications between a client and a communicative element of the resource or property, and the scanning of an NFC tag or barcode. At 730, information associated with the reunification event indicating the resumption of use of a resource of the reclamation of a piece of property is transmitted. The transmitted information may include but is not limited to the time at which the resumption of use or reclamation event occurred, the location at which the event occurred, an identifier of the resource or property, and an identifier of the client.

Figure 8:
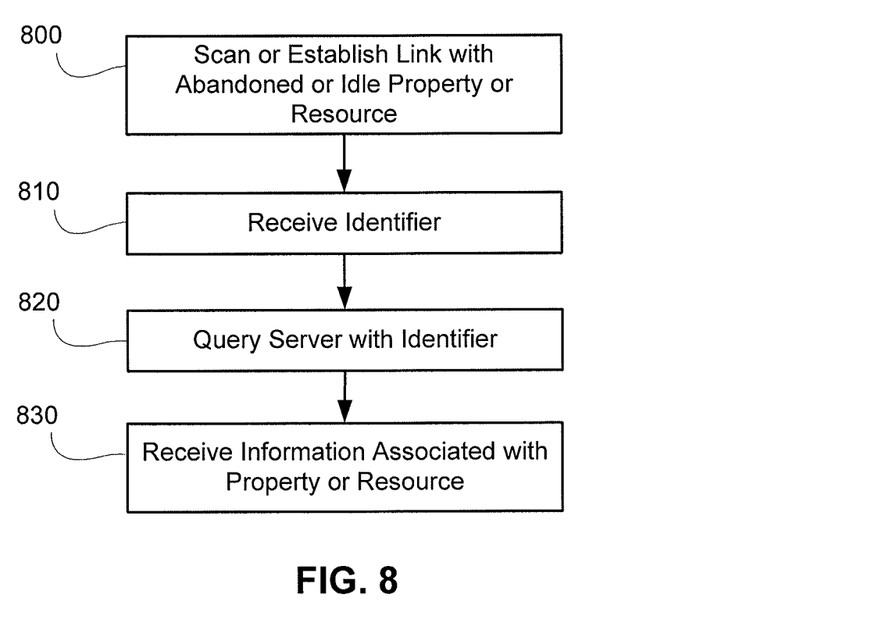
FIG. 8. is a flow diagram illustrating an example method for requesting and receiving information pertaining to idle or abandoned resources or property, according to one aspect of the disclosure.

FIG. 8. is a flow diagram illustrating an example method for requesting and receiving information pertaining to idle or abandoned resources or property, according to one aspect of the disclosure. At 800, the abandoned property or idle resource is scanned. Alternatively, a connection or link is established with the abandoned property or idle resource at 800. At 810, an identifier of the idle resource is received as a result of the scan or as a result of the establishment of a link or connection with the property or resource. At 820, a query including the identifier received at 810 requesting information pertaining to the property or resource is sent. At 830, information associated with the property or resource is received in response to the sending of the query. For example, if the owner of the resource permits, the information received from the server may include the time at which a resource was left idle, the identity of the owner of the resource, the contact information of the owner of a resource, and the current whereabouts of a client associated with the owner of the resource. Alternatively, if the owner of property permits, the information received from the server may include the time at which a piece of property became abandoned, the identity of the owner of the abandoned property, the contact information for the owner of the resource, and the current whereabouts of the owner of the resource.

Figure 9:
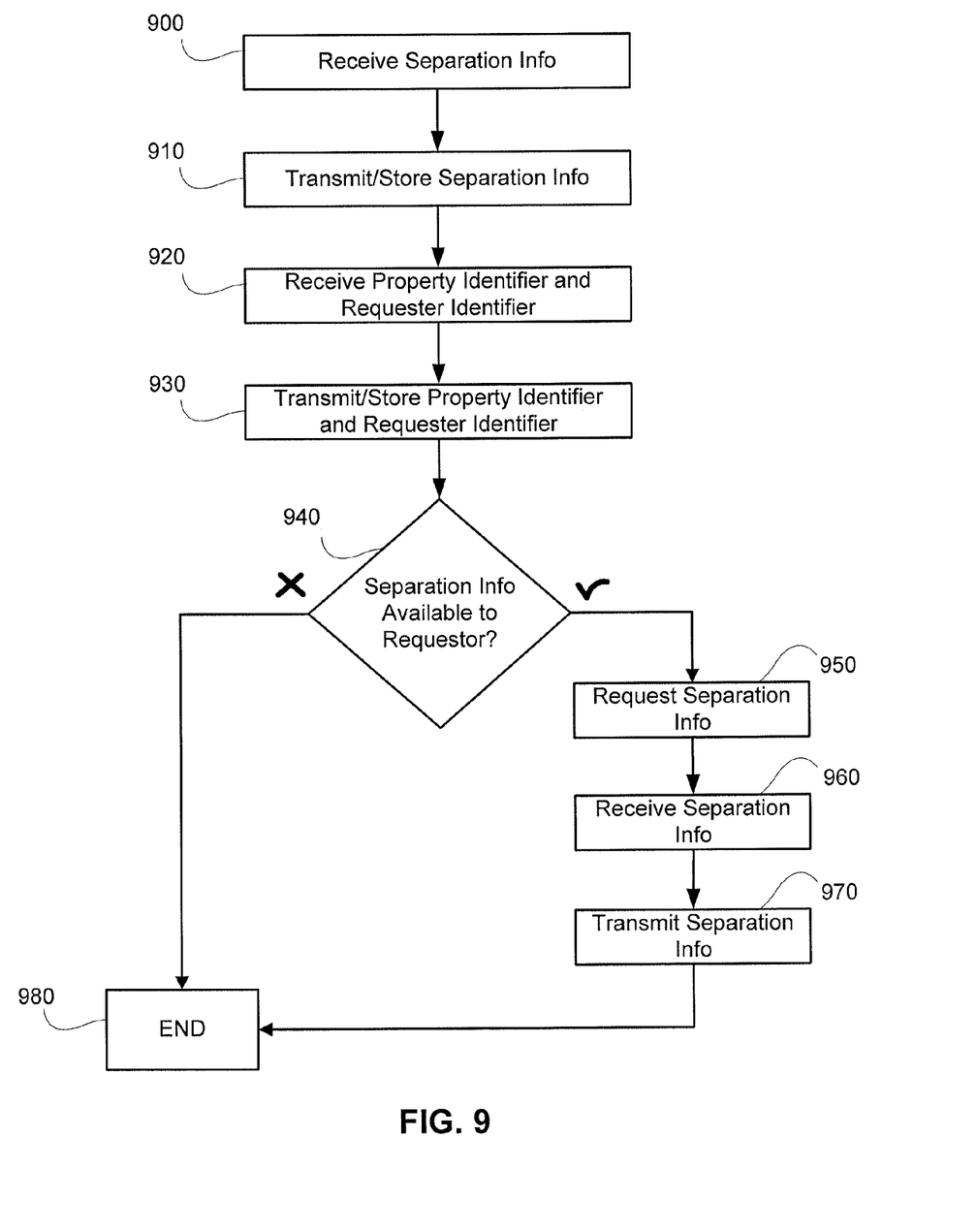
FIG. 9 is a flow diagram illustrating an example method for determining the duration of resource idleness or of temporary abandonment, according to one aspect of the disclosure.

FIG. 9 is a flow diagram illustrating an example method for determining the duration of resource idleness or of temporary abandonment, according to one aspect of the disclosure. At 900, separation information, i.e. information indicating that an event indicating the cessation of use of a resource or the abandonment of a piece of property is received. At 910, information pertaining to the separation event is stored or transmitted to a data store. At 920, a property identifier and a requester identifier are received. At 930, the property identifier and the requester identifier are stored or transmitted to a data store. At 940, it is determined whether or not the requester has permission to access the separation information received at 900 or some subset thereof. If the separation information is not available to the requester, the process proceeds to 980 where it ends. However, if the requester has permission to access the separation information received at 900 or some subset thereof, the process proceeds to 950 where separation information is requested from the location where it is stored. At 960, the separation information or some subset thereof is received from the location where it is stored. At 970, the subset of the separation information to which the requester has access is transmitted to the requester.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method comprising:

receiving, by a server and from a first client device associated with a user, an indication that a property is no longer being used by the user, the indication that the property is no longer being used by the user including at least one of an indication that a wireless personal area network (WPAN) connection between the first client device and the property has been severed, or an indication that a wireless local area network (WLAN) connection between the first client device and the property has been severed;

receiving, by the server and from a second client device associated with a different user, a query requesting information about the property, the query including an identifier of the property received by the second client device via short-range communication; and providing, by the server and to the second client device, at least a portion of the information about the property including an indication that the property is available for use by the different user.

2. The method of claim 1, further comprising:
responsive to receiving the query, determining, by the server and based at least in part on privacy settings of the property, whether the second client device is restricted from receiving the information about the property;
responsive to determining that the second client device is restricted from receiving the information, sending, by the server and to the second client device, a request for authentication information for the second client device;
receiving, by the server and from the second client device, the authentication information; and
determining, by the server and based on the authentication information, whether the second client device is permitted to access at least the portion of the information about the property,
wherein providing at least the portion of the information about the property is in response to determining that the second client device is permitted to access the portion of the information.

3. The method of claim 2, wherein the authentication information includes user account information for the different user, and wherein the determining whether the second client device is permitted to access at least the portion of the information about the property comprises:
determining, by the server and based on the user account information for the different user, whether the a user account of the different user is a member of a class of user accounts permitted to receive a subset of the information about the property.

4. The method of claim 3, wherein the class of user accounts is defined by one or more of a social network designation, or an individual selection of user accounts by a user account associated with the first client device.

5. The method of claim 1, wherein the information about the property includes at least one of, an identifier of the property, an identifier of the first client device, an identifier of a user account linked to the first client device, or contact information associated with the user account linked to the first client device.

6. The method of claim 1, wherein the short-range communication used by the second client device to receive the identifier of the property includes one or more of a wireless personal area network (WPAN), a wireless local area network (WLAN), or near field communication (NFC).

7. A computer readable storage device having stored thereon computer executable instructions that cause one or more processors to:
receive, from a first client device associated with a user, an indication that a property is no longer being used by the user, the indication that the property is no longer being used by the user including at least one of an indication that a wireless personal area network (WPAN) connection between the first client device and the property has been severed, or an indication that a wireless local area network (WLAN) connection between the first client device and the property has been severed;
receive, from a second client device associated with a different user, a query requesting information about the property, the query including an identifier of the property received by the second client device via short-range communication; and
provide, to the second client device, at least a portion of the information about the property including an indication that the property is available for use by the different user.

8. The computer readable storage device of claim 7, wherein the computer executable instructions further cause the one or more processors to:
responsive to receiving the query, determine, based at least in part on privacy settings of the property, whether the second client device is restricted from receiving the information about the property;
responsive to determining that the second client device is restricted from receiving the information, send, to the second client device, a request for authentication information for the second client device;
receive, from the second client device, the authentication information;
determine, based on the authentication information, whether the second client device is permitted to access at least the portion of the information about the property; and
provide at least the portion of the information about the property in response to determining that the second client device is permitted to access the portion of the information.

9. The computer readable storage device of claim 8, wherein the authentication information includes user account information for the different user, and wherein the computer executable instructions cause the one or more processors to determine whether the second client device is permitted to access at least the portion of the information about the property by at least causing the one or more processors to:
determine, based on the user account information for the different user, whether a user account of the different user is a member of a class of user accounts permitted to receive a subset of the information about the property.

10. The computer readable storage device of claim 9, wherein the class of user accounts is defined by one or more of a social network designation, or an individual selection of user accounts by a user account associated with the first client device.

11. The computer readable storage device of claim 7, wherein the information about the property includes at least one of, an identifier of the property, an identifier of the first client device, an identifier of a user account linked to the first client device, or contact information associated with the user account linked to the first client device.

12. The computer readable storage device of claim 7, wherein the short-range communication used by the second client device to receive the identifier of the property includes one or more of a wireless personal area network (WPAN), a wireless local area network (WLAN), or a near field communication (NFC).

13. A device comprising:
one or more processors;
a network interface; and
a storage device configured to store instructions that, when executed, cause the one or more processors to:
receive, via the network interface and from a first client device associated with a user, an indication that a property is no longer being used by the user, the indication that the property is no longer being used by the user including at least one of an indication that a wireless personal area network (WPAN) connection between the first client device and the property has been severed, or an indication that a wireless local area network (WLAN) connection between the first client device and the property has been severed;

receive, via the network interface and from a second client device associated with a different user, a query requesting information about the property, the query including an identifier of the property received by the second client device via short-range communication; and provide, via the network interface and to the second client device, at least a portion of the information about the property including an indication that the property is available for use by the different user.

14. The device of claim 13, wherein the instructions further cause the one or more processors to:

responsive to receiving the query, determine, based at least in part on privacy settings of the property, whether the second client device is restricted from receiving the information about the property;

responsive to determining that the second client device is restricted from receiving the information, send, via the network interface and to the second client device, a request for authentication information for the second client device;

receive, via the network interface and from the second client device, the authentication information; and determine, based on the authentication information, whether the second client device is permitted to access at least the portion of the information about the property, wherein at least the portion of the information about the property is provided in response to determining that the second client device is permitted to access the portion of the information.

15. The device of claim 14, wherein:

the authentication information includes user account information for the different user; and the instructions cause the one or more processors to determine whether the second client device is permitted to access at least the portion of the information about the property by at least causing the one or more processors to determine, based on the user account information for the different user, whether the a user account of the different user is a member of a class of user accounts permitted to receive a subset of the information about the property.

16. The device of claim 15, wherein the class of user accounts is defined by one or more of a social network designation, or an individual selection of user accounts by a user account associated with the first client device.

17. The device of claim 13, wherein the information about the property includes at least one of, an identifier of the property, an identifier of the first client device, an identifier of a user account linked to the first client device, or contact information associated with the user account linked to the first client device.

18. The device of claim 1, wherein the short-range communication used by the second client device to receive the identifier of the property includes one or more of a wireless personal area network (WPAN), a wireless local area network (WLAN), or near field communication (NFC).

* * * * *